(12) United States Patent
Diemer et al.

(10) Patent No.: US 6,564,919 B2
(45) Date of Patent: May 20, 2003

(54) PRESSURE PLATE FOR A FRICTION CLUTCH

(75) Inventors: Matthias Diemer, Niederwerrn (DE); Frank Distler, Münster (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/896,785

(22) Filed: Jun. 29, 2001

(65) Prior Publication Data

US 2002/0014387 A1 Feb. 7, 2002

(30) Foreign Application Priority Data

Jun. 29, 2000 (DE) .......................... 100 31 635

(51) Int. Cl.⁷ .............................................. F16D 13/72
(52) U.S. Cl. .............................. 192/107 M; 192/70.14; 192/113.4
(58) Field of Search ................ 192/70.14, 70.27, 192/89.23, 107 M, 113.4

(56) References Cited

U.S. PATENT DOCUMENTS

| | | | | |
|---|---|---|---|---|
| 3,584,718 A | * | 6/1971 | Schiefer et al. .......... | 192/70.14 |
| 4,422,538 A | * | 12/1983 | Krumm .................... | 192/70.14 |
| 5,499,704 A | * | 3/1996 | Hays ........................ | 192/70.27 |
| 5,655,637 A | | 8/1997 | Hays ........................ | 192/70.14 |
| 5,765,674 A | | 6/1998 | Schierling ................ | 192/89.23 |
| 5,901,826 A | * | 5/1999 | Datta ....................... | 192/70.14 |
| 6,202,820 B1 | | 3/2001 | Peinemann et al. ...... | 192/70.12 |

FOREIGN PATENT DOCUMENTS

| | | |
|---|---|---|
| DE | 199 50 369 | 5/2000 |
| GB | 2 162 613 | 2/1986 |
| GB | 2 184 203 | 6/1987 |
| JP | 5-180271 | 7/1993 |

* cited by examiner

*Primary Examiner*—Richard M. Lorence
(74) *Attorney, Agent, or Firm*—Cohen, Pontani, Lieberman & Pavane (57) ABSTRACT

The pressure plate has at least one friction surface region which can be pressed against a friction facing arrangement of a clutch disk or the like, wherein the pressure plate is formed at least partially from a first material, and wherein a second material having thermal contact with the first material is provided in the pressure plate at least in some areas. In order to be able to compensate for negative umbrella deformation of the pressure plate caused by friction heat during operation of the clutch, the second material has a different thermal expansion, particularly a greater thermal expansion, than the first material.

37 Claims, 10 Drawing Sheets

PRESSURE PLATE FOR A FRICTION CLUTCH

BACKGROUND OF THE INVENTION

1. Field of the Invention

The present invention is directed to a pressure plate for a friction clutch, wherein the pressure plate has at least one friction surface region which can be pressed against a friction facing arrangement of a clutch disk or the like, and wherein the pressure plate is formed at least partially from a first material, and wherein a second material having thermal contact with the first material is provided in the pressure plate at least in some areas.

2. Description of the Related Art

In friction clutches, pressure plates serve to clamp the friction facings of a clutch disk between a flywheel and the pressure plate. In this way, a torque transmission state is produced when the clutch is closed. In order to achieve this result, the pressure plates are acted upon by an energy accumulator, for example, a diaphragm spring, and are pretensioned in the direction of the friction facings and flywheel. During the engagement and disengagement processes, the different surface regions of the friction facings and pressure plate or flywheel enter into frictional engagement with one another resulting in friction heat.

Particularly when the friction clutch is used in a vehicle, heat is guided to one side of the pressure plate on its friction surface during the startup process. The flywheel is also heated on one side, so that the effects, disadvantages and steps described in the following can also apply to the flywheel.

Because of the heating on one side, a temperature difference occurs relative to the other side of the pressure plate which faces away from the friction surface. This temperature difference initially causes an elastic deformation of the pressure plate such that the radial outer area of the pressure plate draws back from the friction surface, so that the average friction radius decreases. This is known as "umbrella deformation". This umbrella effect causes the pressure plate to deform in the manner of an umbrella such that its radial inner area is pressed in the direction of the flywheel, which means that this area can protrude in axial direction with respect to the radial outer area of the pressure plate.

However, this impairs reliable transmission of the clutch, because the latter can assume an unwanted slip state. Further, during subsequent cooling, the radial outer area of the pressure plate can remain deformed, so that the friction facings wear in a conical manner (usually more on the radial outer side than on the radial inner side).

Previously, in order to counter this problem the pressure plate was made as thick as possible. However, this resulted in a disproportionately heavy and expensive pressure plate. Further, a large space requirement resulted. In another suggested solution, the pressure plate was provided with a concave shape in the cold state. This solution also has a number of disadvantages, for example, inhomogeneous support in the cold state. Another suggestion consisted in providing the pressure plate with a ventilation system for cooling. This solution has the disadvantage that the pressure plates are usually produced from gray cast iron and that there is a poor transmission of heat between gray cast iron and air. Another grave disadvantage is that cooling begins too late to prevent umbrella deformation. It has also been suggested to produce the clutch with a greater diameter. However, this solution has the disadvantage that clutches with large diameters are heavier and more expensive and also have a large space requirement. Further, a larger clutch has an excessive mass moment of inertia, which in turn impedes engine acceleration.

In order to prevent negative effects of this kind which are induced by increased temperature in the friction region, U.S. Pat. No. 6,202,820 suggests a pressure plate for a friction clutch which initially has at least one friction surface region which can be pressed against a friction facing arrangement of a clutch disk or the like. In the friction surface region, the pressure plate is formed at least partially from a first material which ensures that the heat generated by friction is quickly carried away. In a body region adjoining the friction surface region, the pressure plate has a second material which has a high heat absorption capacity for the heat carried away from the friction surface region.

The solution described in the patent ensures that sufficient energy is conducted from the region contacting the friction facings during the engagement and disengagement processes which generally only take up very short periods of time (this means that the generation of heat energy or the conversion of kinetic energy into heat energy will also take place only for a very limited period of time). This energy is occasionally stored temporarily in the body region and is then guided away from the body region to the outside.

SUMMARY OF THE INVENTION

The object of the present invention is to provide another solution by which deformation of the pressure plate caused by heat can be prevented in a simple yet dependable manner.

A pressure plate for a friction clutch is suggested, wherein the pressure plate has at least one friction surface region which can be pressed against a friction facing arrangement of a clutch disk or the like, and wherein the pressure plate is formed at least partially from a first material, and wherein a second material having thermal contact with the first material is provided in the pressure plate at least in some areas. According to the invention, the second material has a different thermal expansion, particularly a greater thermal expansion, than the first material.

In this way, umbrella deformation of the pressure plate under thermal loading can be prevented. For this reason, the pressure plates are constructed so as to be thinner, which is a considerable advantage with regard to cost and the installation space requirement. Further, optimum dependability of transmission of the clutch is ensured at all times.

Due to the second material with a different coefficient of expansion, which will also be referred to in the course of the following description as counter-expansion mass, the friction radius is increased, or its reduction is prevented, over several successive starting processes. The design can be realized in a neutral manner with respect to installation space. Further, common mechanical engineering methods and materials can be used.

A basic idea of the present invention is that a region of the pressure plate is constructed from a second material (e.g., aluminum) which has a different, preferably greater, thermal expansion coefficient than the first material, e.g., gray cast iron, from which the pressure plate is made in part.

In U.S. Pat. No. 6,202,820, frictional heat is guided away as quickly as possible and stored temporarily so that deformations are prevented. For this purpose, the first material has a high thermal conductivity. The friction surface region made from this material is in frictional contact with the friction faces of the clutch disk during the engagement and disengagement processes. Due to the heat-conducting material of the friction surface region, the heat is quickly conducted away into the second material which is in thermal contact with the first material. The second material comprises a material with high specific thermal capacity. Accordingly, it is suitable for storing heat in a particularly effective manner without resulting in negative deformation. The second material must be suitable for intermediate storage of the large quantities of heat occurring briefly during the engagement and disengagement processes without resulting in deformations in the pressure plate. At the conclusion of the engagement or disengagement process, the heat can be given off to the outside.

In the solution suggested according to the invention, deformation due to the occurring friction heat is not eliminated. Instead, the effect achieved by the second material is that a counter-expansion occurs which is controlled via the arrangement, mass and construction of the second material in such a way that it counteracts the deformation of the first material. In this way, the friction radius of the pressure plate is not changed as a whole or at least is not reduced. Accordingly, the second material is a counter-expansion mass relative to the first material.

In principle, the invention is not limited to determined materials for the second material. It is important only that the second material is made to expand when heat energy is absorbed such that the disadvantageous umbrella deformation of the entire pressure plate is reliably prevented.

The second material can advantageously have a greater coefficient of expansion than the first material. However, it is also possible for the second material to have either a negative thermal expansion coefficient or, in comparison to the first material, a smaller thermal expansion coefficient in terms of amount. In this case, the umbrella deformation is prevented or compensated in that the second material contracts when heat is introduced and generates a bending-back moment in a corresponding arrangement.

Gray cast iron, steel and the like, for example, can be, but need not exclusively be used as first material. Aluminum, for example, can be, but need not exclusively be used as second material. Aluminum is relatively inexpensive and has a thermal expansion coefficient which, at $24*10^{-6}$/K, is roughly twice that of gray cast iron ($=10-12*10^{-6}$/K). However, magnesium ($=26*10^{-6}$/K), copper ($=17*10^{-6}$/K), zinc ($=39*10^{-6}$/K) or other metals are also possible. A further advantage of the above-mentioned materials consists in that they quickly absorb friction heat and expand quickly compared with gray cast iron because of their higher thermal conductivity. The high thermal conductivity can also be utilized in deliberate fashion for improvement in guiding heat away from the friction surface.

The mass distribution between the first material and the second material is given depending on need and application and depends, for example, on the contour of the pressure plate and on the resulting thermal expansion behavior.

The pressure plate can advantageously be constructed substantially annularly.

Various possible constructions of the pressure plate according to the invention for preventing negative umbrella deformation will be described in the following. Depending on the kind of counter-expansion to be achieved by the second material (counter-expansion mass), the second material can be provided in the pressure plate in different ways.

The second material can preferably be provided in the form of at least one added element in the pressure plate. Non-exclusive examples for suitable added elements will be described more fully in the course of the description.

In a further development, it is conceivable that the second material is constructed as a region of the pressure plate.

Depending on the embodiment form, the friction surface region of the pressure plate can be formed chiefly or completely from a first or second material.

The second material can be provided in the pressure plate in such a way that it expands, or can expand, primarily in radial direction. It is also possible for the second material to be provided in the pressure plate in such a way that it expands, or can expand, in axial direction. Naturally, a combination of the two features is also possible. By radial direction is meant a direction vertical to the principal axis of rotation of the pressure plate. By axial direction is meant a direction parallel to the principal axis of rotation of the pressure plate.

The second material can advantageously be provided at the radial outer circumference of the pressure plate. In a further development, the second material can, of course, also be provided radially inside the pressure plate. Of course, combinations of the above-mentioned features are also possible.

It has turned out to be particularly advantageous that a greater thermal expansion is brought about at the radial outer circumference of the pressure plate than at the radial inner circumference. Depending on the embodiment form, the radial component of expansion as well as the axial component of expansion are advantageous to compensate for offsets of the outer circumference of the friction surface.

In a further development, the second material can be provided, at least in some areas, on the side of the pressure plate which lies opposite the friction surface and which is not heated.

In order to place the second material in the pressure plate, the pressure plate can have at least one groove for receiving the second material. The at least one groove can be formed on the radial outer side and/or on the radial inner side of the pressure plate. It is also possible for the at least one groove to be provided on the side of the pressure plate which lies opposite to the friction surface and which is not heated. In this case, the area of the pressure plate located opposite to the friction surface could be cut out in a suitable manner, for example, and the second material could then be cast in this cut out region. Of course, any desired combinations and variants of the arrangement and quantity of grooves are also possible.

The at least one groove can preferably be inclined. Due to the inclination of the groove, the second material located therein, which has, for example, a circular ring shape which will be described in the following, is protected from falling out accidentally, for example, due to centrifugal force.

The second material can advantageously be constructed as at least one circular ring. This circular ring can be constructed as one or more parts. When the circular ring is constructed in multiple parts, there can be segments of 3×120°, 6×60° or the like. When the second material is in the shape of a circular ring, it can be provided, for example, in a corresponding groove as was described above. The circular ring can initially be produced separately in one part or in multiple parts and can then be placed in the groove. The circular ring can also be cast in the groove. For purposes of fastening, the circular ring can be connected with the pressure plate so as to be fixed radially and, depending on the construction, axially, for example, by means of corresponding fixing elements such as suitable fixing pins or the like, by soldering (preferably when the second material is copper or zinc) and the like.

In a further construction, the at least one circular ring can have at least one pin-shaped projection which protrudes from the circular ring. This pin-shaped projection can likewise optionally be made of the second material.

In an embodiment form presented by way of example, the circular ring can be provided, for example, in a groove located on the side of the pressure plate which lies opposite the friction surface and which is not heated. The circular ring of second material can be inserted into this groove as a counter-expansion mass, as it is called. The circular ring can have the pin-shaped projections at the side facing the friction surface of the pressure plate. These pin-shaped projections can be prevented from falling out by means of fixing elements, for example, a snap head or closing head. When the fixing element terminates flush with the friction surface, its end face participates in the friction process. The heat is conducted via the pin-shaped projection into the circular ring. This projection accordingly serves for faster conduction of heat to the second material and for its heating and, therefore, its expansion.

In a further construction, the pressure plate can have at least one bore hole. Preferably, the second material can be provided in the bore hole in the form of at least one added element. The added element can be, but need not exclusively be, constructed as a pin, bolt, screw or the like. However, it is also possible that the bore hole is cast with the second material. A plurality of bore holes are advantageously provided and are arranged so as to be distributed about the circumference of the pressure plate.

If required and depending upon application, the at least one bore hole can be oriented tangentially and/or axially and/or radially in relation to the pressure plate.

In an embodiment form presented by way of example, a plurality of bolts made of the second material are inserted tangentially into the pressure plate provided with corresponding bore holes and are prevented from falling out, for example, by caulking. It is also possible, alternatively or in addition, to introduce bolts axially into the pressure plate and to utilize their radial expansion exclusively. When suitably fixed, e.g., by soldering, caulking, fashioning the bolts as screws, or the like, their axial expansion can be utilized in addition.

The pressure plate can advantageously have at least one notch at its radial outer circumference in which the second material is provided at least in part. The notch can be wedge-shaped, for example.

For this purpose, the second material can be constructed, for example, at the outer radial edge of the notch, in the form of a web connecting the sides of the notch. The web can be constructed, for example, as a circular ring and can be inserted into the notch. This can be carried out, for example, by soldering, caulking, casting in a positive engagement, or the like. In this constructional variant, the web contacts only a small annular area at the pressure plate. However, since the pressure plate is notched more deeply, the radial outer area can bend elastically axially.

The second material can also advantageously be constructed in the form of at least one added element formed as a bolt which penetrates the notch axially and/or radially. In particular, when the bolts penetrate the notch axially and are arranged in the radial outer area of the notch and, therefore, of the pressure plate, an elastic expansion of the pressure plate is possible in this area.

By means of a suitable design of the notch and of the added element of second material penetrating the latter, it is possible for the pressure plate to be ventilated from the inside. For this purpose, the side walls of the notch and the added element define a type of ventilation chamber. In this way and due to the elements of the second material, dissipation of heat can be improved. For this purpose, the added element of second material can have, e.g., corresponding holes, vane-like raised portions and the like for transporting air.

In a further construction, the pressure plate can be formed of the friction surface region and a body region adjoining the latter axially. In this case, the pressure plate is divided into two material regions.

In a construction presented by way of example, the friction surface region is formed at least partially of conventional material, for example, gray cast iron or the like. The body region, on the other hand, can be formed at least partially of the second material and/or one or more added elements of second material. When heat is introduced into the friction surface due to the friction process, for example, during a starting process, a temperature difference occurs which initially ensures that the radial outer region of the friction surface region draws back, so that the friction radius moves radially inward and the dependability of transmission in the clutch is reduced due to the umbrella deformation effect. When heat is no longer introduced, the entire pressure plate and therefore also the body region is increasingly heated. The second material in the body region, expands to a greater extent than the first material, so that with appropriately selected placement of the second material a directed expansion can be achieved in the form of a restoring bending moment which counteracts and compensates for the umbrella deformation effect.

In two non-exclusive embodiment forms which are given by way of example, one or more circular rings can be provided in the body region, particularly on the side of the pressure plate which is located opposite the friction surface and which is not heated. In another construction, it is also possible for the body region to be formed of the second material in its entirety.

The friction surface region and the body region can advantageously be connected with one another via a groove connection. The groove connection which can be constructed, for example, as a dovetail-groove connection is used to improve the connection of the two regions.

In a further construction, the pressure plate can have a cutting edge for supporting an energy accumulator. An energy accumulator of this kind is, for example, a diaphragm spring of the friction clutch. The cutting edge advantageously has means for preventing friction wear or abrasion. For this purpose, the cutting edge can be suitably coated or hardened. It is also possible to place a wire ring in the knife edge, e.g., by caulking, so that it is prevented from slipping out and abrading. Of course, other measures for protecting the cutting edge against unwanted abrasion are also possible. Further, the cutting part can also be part of a facing wear arrangement. The facing wear arrangement can be, for example, a run-up ring or the like.

The contour of the region of the pressure plate comprising the first material can preferably be adapted to the contour of the region of the pressure plate comprising the second material.

In a further construction, it is possible that the second material is provided in a chamber provided in the pressure plate and at least partially fills the latter. The chamber can be limited on all sides by regions of the first material. In another construction, it is possible that the chamber is defined by regions of a first material and partially by regions of a third material. The third material can define the chamber at the side of the pressure plate located opposite to the friction surface and/or on the radial inside and/or on the radial outside. The third material, for example, can be in the form of the second material or in the form of a material differing from the first and second material. The selection of the third material depends on the manner in which the heat generated at the friction surface of the pressure plate is guided away and on the way in which a resulting thermal expansion in the second material is to be directed in order to counteract umbrella deformation.

The pressure plate can advantageously have a region of first material and an adjoining region of second material, wherein the dividing line between the two regions extends from the radial inside to the radial outside in relation to the pressure plate. In particular, the dividing line between the two regions can extend in such a way that more of the second material is provided on the radial outside than on the radial inside. The thermal expansion of the second material can accordingly be controlled in a precise and defined manner. As a result, the friction surface of the pressure plate does not draw back (umbrella deformation) because of the friction heat and the friction radius remains sufficiently large for reliable transmission.

In a further development, the pressure plate can have a region of first material and an adjoining region of second material, wherein the dividing line between the two regions extends axially with respect to the pressure plate, so that the second material is provided on the radial outside compared to the first material. Accordingly, it can be achieved in a particularly advantageous manner that the radial outer region of the pressure plate expands and umbrella deformation is accordingly counteracted.

The second material can advantageously be applied to or introduced into the region of first material by die casting. Accordingly, it is possible to prevent a large distortion in the structural component part itself. In order to be able to achieve die casting, it is advantageous to provide a corresponding sealing surface at the region of first material. Die casting can be realized in a particularly simple manner when the second material is introduced into a corresponding groove in the form of a circular ring with rectangular cross section. The region of first material should be heated prior to die casting in order to improve the connection between the first material and second material and to reduce internal stresses caused by heat.

The first material and the second material can be connected with one another by a material bond or engagement and/or by positive engagement. A material engagement can be, for example, but is not exclusively, soldering, gluing, welding, a penetration of the second material into the friction surface, or the like. A positive engagement which can be carried out as an alternative or in addition to the material engagement can be, for example, a corresponding waffle pattern, screwing, riveting, the second material engaging around the first material, and the like.

In a further construction, at least one receiving groove, especially an annular groove, can be provided on the radial outside for receiving at least one supporting element. The supporting element can be constructed, for example, as a supporting ring. This supporting ring can be produced, for example, by winding a high-strength fiber, for example, a carbon fiber, or a wire. In this way, it is ensured that when thermal expansion occurs the pressure plate is secured radially and only the radial inner area is lifted from the friction surface or deflected.

The different features for realizing the pressure plate according to the invention which were described above can be realized individually as well as in any desired combination.

In addition to the described features, it is possible to influence the umbrella deformation behavior of the pressure plate by means of a corresponding geometric shape of the pressure plate. By varying the radial thickness, axial length, material, adding interruptions in the inner and/or outer area of the pressure plate and the like, its strength ratio from the inner area to the outer area can be adjusted. In addition, a deformation depending upon the temperature gradient and, therefore, a change in the friction radius can be prevented by means of this adjustment.

According to a second aspect, the present invention is directed to a thrust plate assembly, particularly for a friction clutch in a motor vehicle. According to the invention, this thrust plate assembly has at least one pressure plate according to the invention as was described above.

According to a further aspect of the invention, a flywheel or a secondary mass of a two-mass flywheel is provided which, according to the invention, has the above-described features specific to the pressure plate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
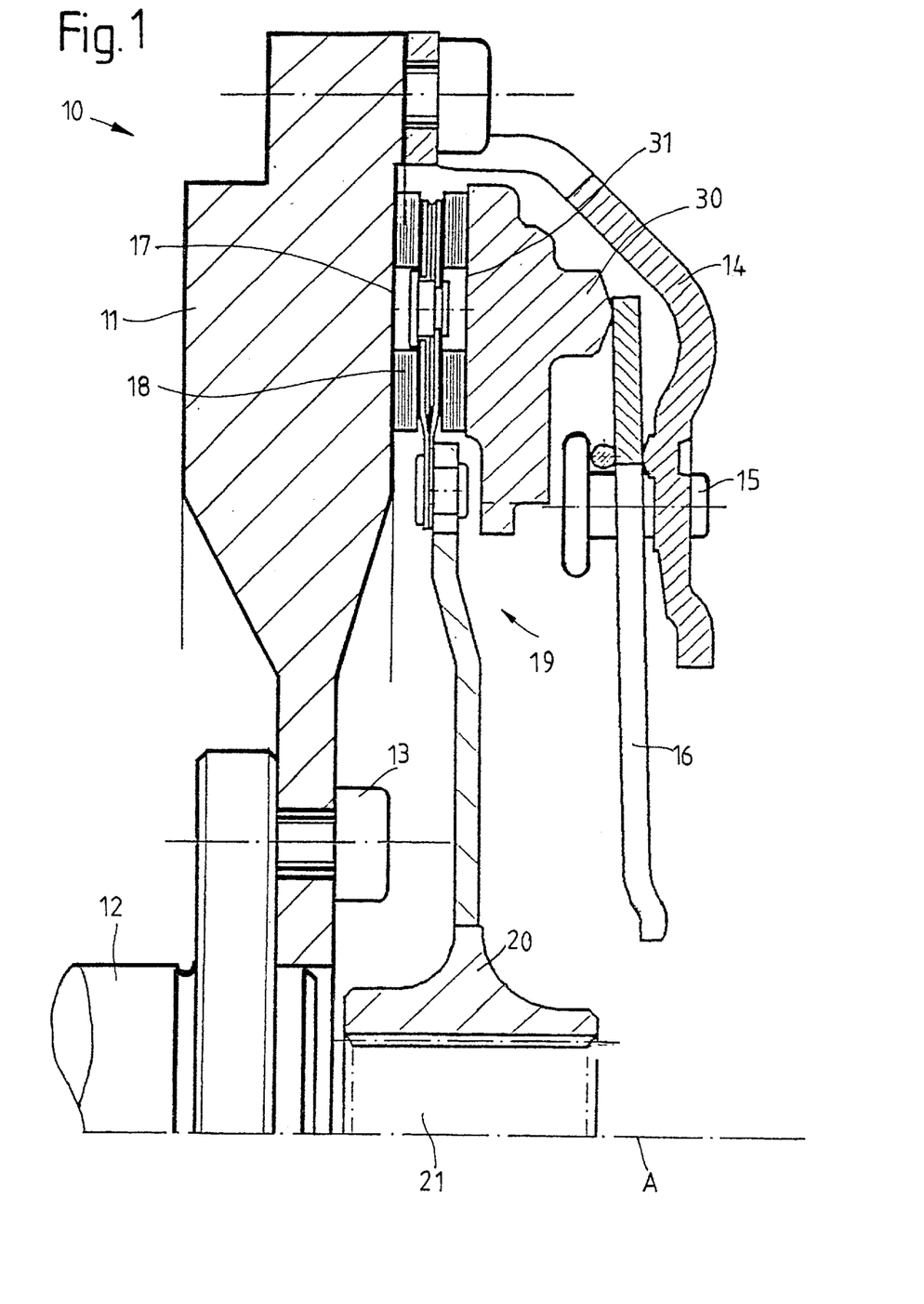
FIG. 1 shows a simplified partial longitudinal section of a friction clutch for a motor vehicle.

First, FIG. 1 shows a friction clutch 10 for a motor vehicle. The clutch 10 has a flywheel 11 which is connected by its radial inner region with a crankshaft 12 or other drive shaft in a manner known per se. "Radial inner side" and, later, "radial outer side" are employed in the following in relation to the principal axis of rotation A. The connection of the flywheel 11 to the crankshaft 12 is realized, for example, by means of screw bolts 13. A housing 14 is fixed on the radial outer side of the flywheel 11. A pressure plate 30 is held in the housing 14 so as to be fixed with respect to rotation relative to it but axially displaceable in direction of the axis of rotation A. An energy accumulator, for example, in the form of a diaphragm spring 16, is connected with the housing 14 via spacer pin 15 and can be displaced parallel to the axis of rotation A via a disengagement mechanism, not shown. The pressure plate 30 can therefore move away from or toward the flywheel 11, which corresponds to a disengagement or engagement process of the clutch 10.

Friction facings 18 of a clutch disk 19 can be clamped between a friction surface 31 of the pressure plate 30 and a corresponding friction surface 17 of the flywheel 11. The clutch disk 19 is connected with a hub 20, possibly by means of a suitable torsional vibration damper (not shown). The hub 20 is coupled in turn with a driven shaft, for example, a transmission take-off shaft 21, via a toothing so as to be fixed with respect to rotation relative to it.

In clutches 10 of this kind, relatively high temperatures occur in the region of the friction surfaces 17, 31 when engagement and disengagement processes are carried out. These high temperatures are generated by the slip occurring between the friction facings 18 and the flywheel 11 or pressure plate 30 during clutch processes. The high temperatures can cause deformations of the pressure plate 30 and flywheel 17, known as umbrella deformation. This umbrella deformation is very disadvantageous because the dependable transmission of the clutch 10 is considerably reduced by the reduction in the friction radius.

In order to avoid these disadvantages, the following different possibilities of an advantageous construction of the pressure plate 30 are described. The flywheel 11 could also be outfitted with the features of the pressure plate 30 specific to the invention.

Figure 2:
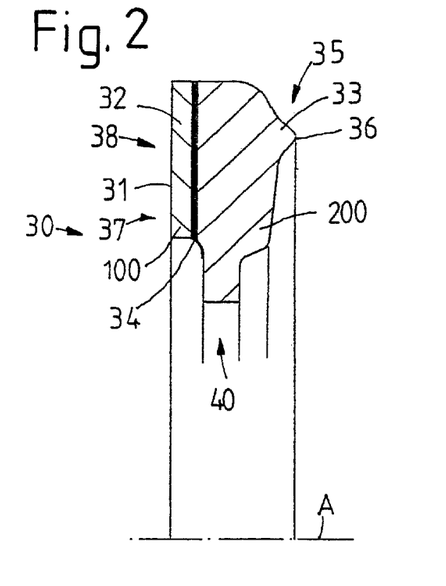
FIG. 2 shows a partial longitudinal section of a first embodiment form of the pressure plate according to the invention.

FIG. 2 shows a pressure plate 30 which initially has a friction surface 31 for contacting the friction facings 18 (see FIG. 1) and a knife edge 36 for supporting the diaphragm spring 16. The pressure plate 30 has a pressure plate base body 40 which is divided into two material regions. The first material region forms the friction surface region 31 and is made from a first material 100, for example, a gray cast iron. The body region 33 which adjoins the friction surface region axially and which is located on the side 35 of the pressure plate 30 that faces away from the friction surface 31 and is not directly heated, is made of a second material 200. The axial orientation is parallel to the axis of rotation A. The second material 200 has a greater thermal expansion coefficient than the first material 100 and comprises, for example, magnesium, aluminum, copper, zinc or the like. The two regions 32, 33 are connected at their dividing line 34 by a material connection which can be, for example, soldering, gluing, welding or riveting. In addition, a positive engagement can also be provided.

When heat is introduced to the friction surface 31 due to a friction process, for example, when starting up, there is a temperature difference between the friction surface region 32 of the first material 100 and the body region 33 of second material 200. Initially, the temperature difference causes the radial outer region 38 of the friction surface 31 to draw back so that the friction radius gradually moves radially inward to radial inner region 37 and the transmitting reliability of the clutch is reduced. When the introduction of heat ceases, the pressure plate 30 is uniformly warmed. The body region 33 of the second material 200 expands to a greater extent than the friction surface region 32 of the first material 100. This expansion in the form of a restoring bending moment is transmitted in turn to the friction surface region 32 through the connection of the two regions 32, 33 at the dividing line 34, so that the pressure plate 30 bends back radially outward 38 again in the direction of the friction surface 31 and the friction radius increases again.

This process takes place during one or more starting processes depending on the magnitude of the masses and on the period of time, depending on the latter, for warming up.

The principle described herein is also the basis for the following embodiment examples. Therefore, in order to avoid repetition only the special construction of these embodiment examples will be described in the following. Identical component elements have been provided with identical reference numbers. It is noted with regard to all embodiment forms that the required mechanical stiffness against umbrella deformation is provided particularly by the material regions of the pressure plate 30 comprising the first material 100.

Figure 3:
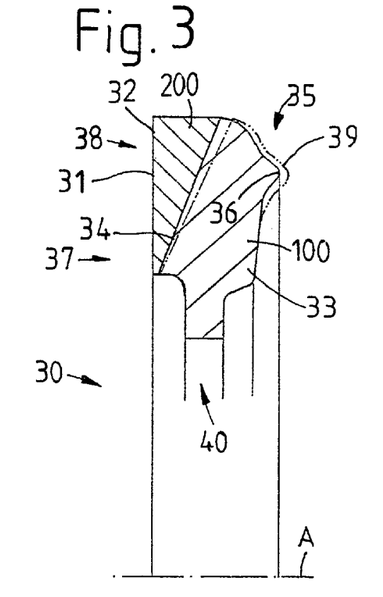
FIG. 3 shows a partial longitudinal section of a second embodiment form of the pressure plate according to the invention.

The dividing line 34 and, therefore, the connection of the friction surface region 32 with the body region 33 can also be inclined or can have any desired contour as will be seen, for example, in FIG. 3. The thermal expansion coefficient of the two regions 32, 33 can be influenced in a deliberate manner by means of the specific arrangement of the dividing line 34.

In the example shown in FIG. 3, the friction surface region 32 is made of a second material 200 which expands to a greater extent when heat is introduced. The body region 33 is made of a first material 100 which expands less in comparison. It is essential in this embodiment form that the dividing line 34 between the materials 100, 200 extends in such a way that there is more of the highly expanding material 200 on the radial outer region 38 than on the radial inner region 37. Since the thermal expansion coefficient is linear, the volume of the friction surface region 32 expands to a greater extent on the radial outer side 38 and ensures that the friction surface 31 does not recede. The friction radius accordingly remains sufficiently large for reliable transmission even when the first material 100 of the body region 33 of the pressure plate 30 assumes the contour designated by 39 due to the umbrella deformation. Since the friction surface region 32 of the second material 200 is formed of a material which is usually highly heat-conductive, it provides, in addition to this, for a fast heat conduction and a quick warming of the pressure plate 30.

Figure 4:
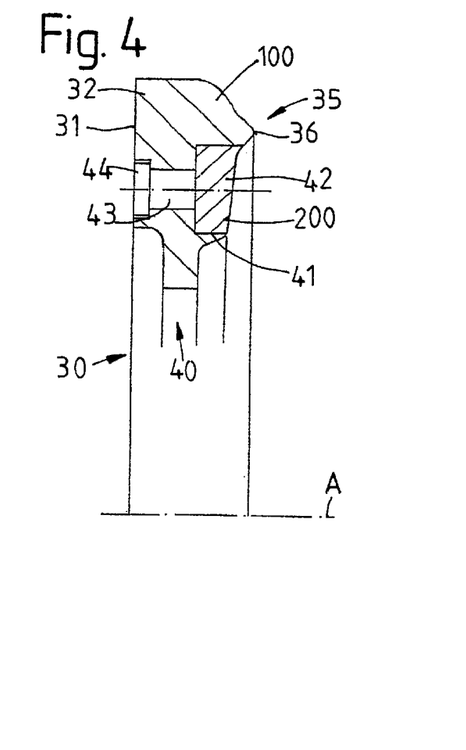
FIG. 4 shows a partial longitudinal section of a third embodiment form of the pressure plate according to the invention.

The pressure plate base body 40 of the pressure plate 30 shown in FIG. 4 is made of a first material 100 formed, e.g., as gray cast iron. The second material 200 in the form of a circumferentially extending circular ring 42 is embedded in an annular groove 41. The circular ring 42 can be inserted into the groove 41 as a finished structural component part or can be cast in the groove 41. At the side facing the friction surface 31, the circular ring 42 has pin-shaped projections 43 which are prevented from falling out by means of closing heads 44. When the closing heads 44 terminate flush with the friction surface 31, their end faces participate in the friction process. Accordingly, heat enters the closing heads 44 and, therefore, also the projections 43. Since the circular ring 42 is made of a second material 200 with a very high thermal expansion coefficient, which also frequently has a very high thermal conduction coefficient, the pin-shaped projections 43 serve to accelerate the conduction of heat and to heat the second material 200. Due to its expansion, the circular ring 42 acts against the above-described umbrella deformation already after a few starting processes.

Figure 5:
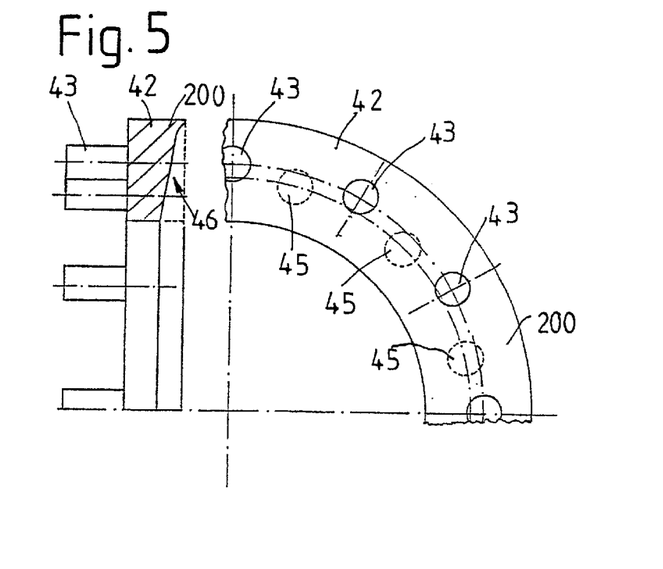
FIG. 5 shows a circular ring of second material according to FIG. 4 before installation in the pressure plate.

FIG. 5 shows a circular ring 42 according to FIG. 4 as it appears before assembly of the pressure plate 30. In addition to the pin-shaped projections 43 shown in FIG. 4, additional pin-shaped projections 45 can also be provided on one or more other partial circles (shown by dash-dot lines). The contour 46 of the circular ring 42 comprising the second material 200 can be adapted to the back side of the pressure plate 30 which is not shown explicitly. The cross-sectional shape of the projections 43, 45 can, but need not, be circular.

Figure 6:
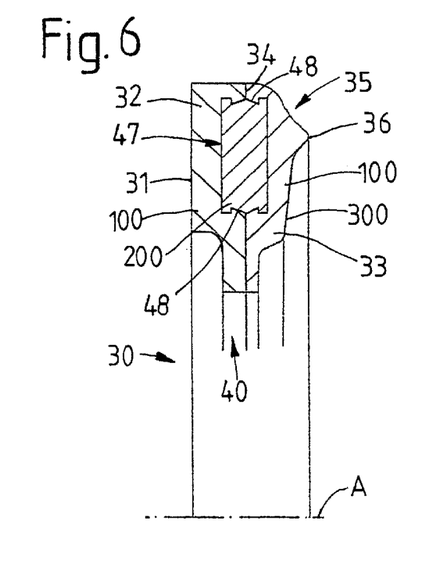
FIG. 6 shows a partial longitudinal section of a fourth embodiment form of the pressure plate according to the invention.

In the pressure plate 30 shown in FIG. 6, the pressure plate base body 40 is divided at the dividing line 34 into a friction surface region 32 of a first material 100 and a body region 33 remote of the friction surface. The body region 33 can be made of a first material 100 or a third material 300. When a third material is used, it can be a material different than the first material 100 and second material 200. The friction surface region 32 and the body region 33 form a chamber 47 in which the second material 200 with a high thermal expansion coefficient is enclosed. The mass distribution is a matter of design in this instance. It depends on the contour of the pressure plate 30 and on the resulting thermal expansion behavior.

Clip connections 48 are provided for fixing the second material 200. These clip connections 48 clasp the friction surface region 32 and body region 33 in the second material 200 and accordingly hold the pressure plate 30 together. The clip connections 48 can be constructed either as a circumferentially extending edge or as interrupted, individual hooks.

Figure 7:
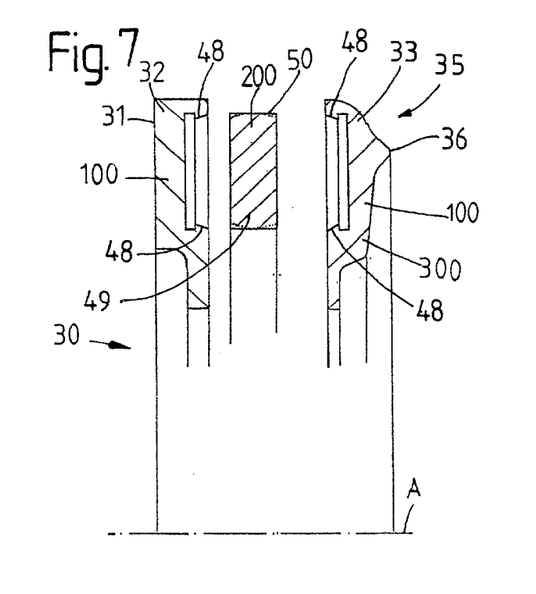
FIG. 7 shows the individual elements of the pressure plate according to FIG. 6 be fore assembly.

The process of mounting the pressure plate 30 shown in FIG. 6 is described with reference to FIG. 7. The second material 200 can have essentially the shape of a hollow cylinder 49 in the initial state. When required, the hollow cylinder 49 can be outfitted with insertion bevels 50 for the clip connections 48. When joining, for example, in a suitable press under high pressure vertical to the friction surface 31, the clip connections 48 are molded into the second material 200 in an elastic or plastic manner and securely connect the individual components parts with one another. Instead of hook-shaped clip connections 48, the individual component parts can also be connected by a shrink bond which must be designed in such a way that the restoring moment of the second material 200 which was described above can be transmitted to the friction surface region 32.

Figure 8:
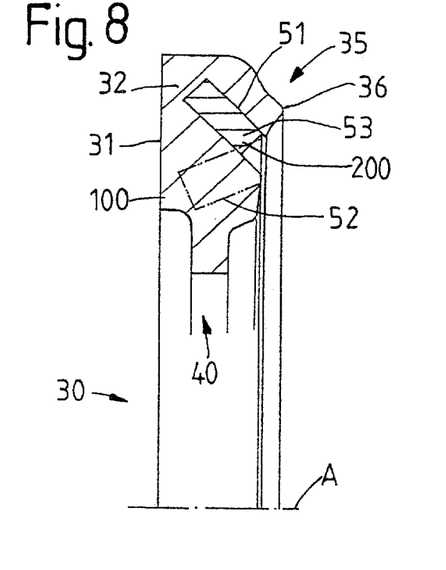
FIG. 8 shows a partial longitudinal section of a fifth embodiment form of the pressure plate according to the invention.

In the pressure plate 30 shown in FIG. 8, the second material 200 has the form of a divided circular ring 53 which is inserted in segments, for example, 3×120°, 6×60° or the like, into a corresponding annular groove 51 in the pressure plate base body 40 of a first material 100. Due to the inclination of the groove 51, the circular ring 53 is prevented from slipping out accidentally, for example, under centrifugal force. An alternative or additional groove is designated by 52.

Figure 9:
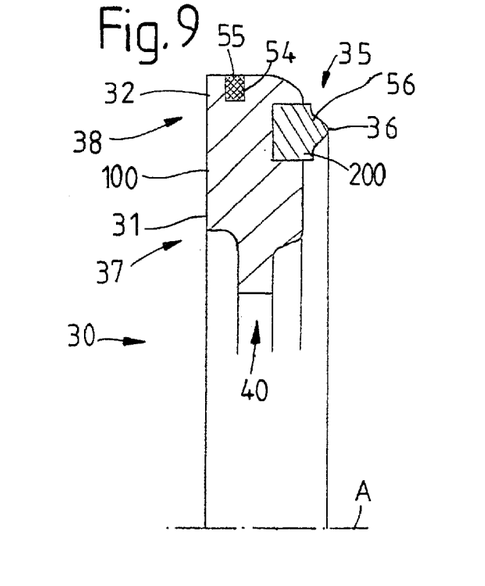
FIG. 9 shows a partial longitudinal section of a sixth embodiment form of the pressure plate according to the invention.

The pressure plate 30 shown in FIG. 9 has a pressure plate base body 40 which has a receiving groove 54 on the radial outer side 38 in which a supporting element, in this case a supporting ring 55, is inserted. The supporting ring can be produced, for example, by winding on a high-strength fiber, for example, a carbon fiber, or a wire. Ideally, this supporting ring has a low thermal expansion coefficient and a high modulus of elasticity. The supporting element ensures that the pressure plate 30 is secured radially during heat expansion and only the radially inner region 37 of the friction surface 31 can be lifted or deflected.

In addition, a circular ring 56 which comprises the second material 200 and which has already been described repeatedly with respect to its action is provided at the side 35 of the pressure plate base body 40 which faces away from the friction surface 31 and which is not directly heated. In this example, the pressure plate base body 40 comprises only one friction surface region 32 of a first material 100.

The circular ring 56 likewise carries the cutting edge 36 for a diaphragm spring which is not shown. If necessary, the cutting edge 36 might have to be made resistant to wear by steps, known per se, such as hardening or coating.

As another possibility, the supporting ring 55 can have a negative thermal expansion coefficient. This means that the umbrella deformation is prevented or compensated in that the ring contracts and generates a bending-back moment when heat is introduced.

Figure 10:
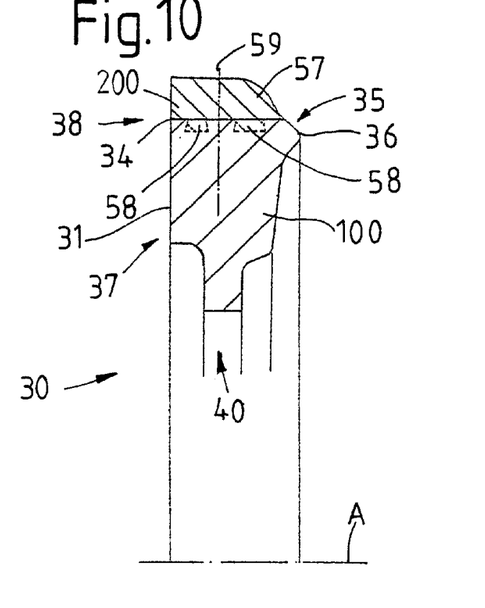
FIG. 10 shows a partial longitudinal section of a seventh embodiment form of the pressure plate according to the invention.

FIG. 10 shows a modification of the pressure plate 30 according to FIG. 9 in which a tension ring 57 takes over the function of the supporting ring 55. Cross-sectionally, it is constructed so as to be larger and can extend over the entire axial width of the pressure plate 30. It is made of a second material 200 with greater thermal expansion than the rest of the pressure plate base body 40 which is formed of the first material 100. The function of the tension ring 57 is to expand to a greater extent than the rest of the pressure plate base body 40 of first material 100 when heat is introduced and to expand the pressure plate 30. Since the second material 200 usually also has an improved heat conductivity compared to the first material 100 in addition to greater thermal expansion, it warms up faster than the first material 100. The pressure plate base body 40 of first material 100 might deform because of the temperature difference between the friction surface 31 and the rear side 35 and tends to move away from the friction surface 31 on the radial outer side 38. At the same time, the tension ring 57 of the second material 200 quickly expands extensively and straightens the pressure plate base body 40 again.

For reliable transmission of these tensile forces, the tension ring 57 can be welded, glued or soldered with the rest of the pressure plate base body 40 at the dividing line 34. Alternatively or in addition, a positive engagement in the form of a groove connection is designated by 58. As a further possibility, the tension ring 57 can be fastened by means of fastening elements such as bolts, screws, rivets or the like, whose orientation or axis is designated by 59.

Figure 11:
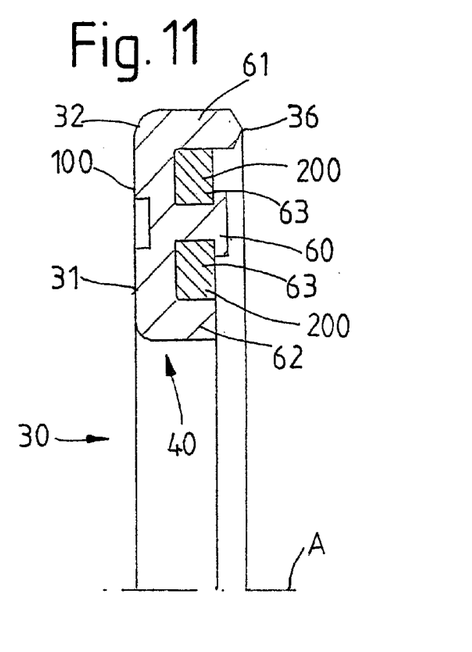
FIG. 11 shows a partial longitudinal section of an eighth embodiment form of the pressure plate according to the invention.

FIG. 11 shows a pressure plate 30 whose pressure plate base body 40 of sheet metal comprises the first material 100. At least one rivet pin 60 is formed from the sheet metal and penetrates a body 63 of second material 200 and is riveted with the second material 200. It is important in this case that the body 63 of the second material is supported at the shoulders 61, 62 in order to transmit the counter-expansion moment generated by heat to the pressure plate base body 40. The shoulder 61 carries the cutting edge 36 for the diaphragm spring. The friction surface is designated by 31.

Figure 12:
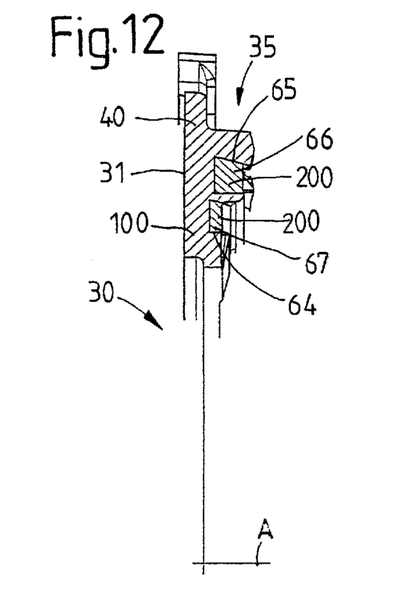
FIG. 12 shows a partial longitudinal section of a ninth embodiment form of the pressure plate according to the invention.

The pressure plate 30 shown in FIG. 12 initially has a pressure plate base body 40 of first material 100 which forms a friction surface region 32. Two grooves 64, 65 are cut out on the side 35 which is located opposite the friction surface 31 and which is not heated, wherein respective circular rings 66, 67 of second material 200 are located in the two grooves 64, 65. The circular rings 66, 67 can be cast in the grooves 64, 65 by means of die casting. For this purpose, it is particularly advantageous when the grooves 64, 65 are constructed so as to be substantially rectangular.

Figure 13:
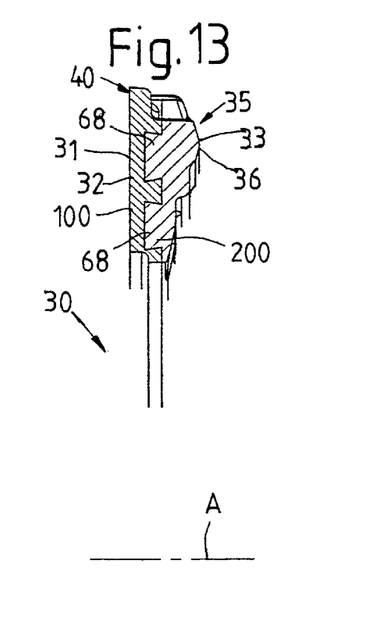
FIG. 13 shows a partial longitudinal section of a tenth embodiment form of the pressure plate according to the invention.

The pressure plate 30 shown in FIG. 13 has a pressure plate base body 40 which is formed of a friction surface region 32 of the first material 100 and an adjoining body region 33 of second material 200. The body region 33 is made entirely of the second material 200 and is connected with the friction surface region 32 via a dovetail-groove connection 68. This improves the connection between the two regions 32, 33. The cutting edge 36 is coated so that there is no abrasion.

Figure 14:
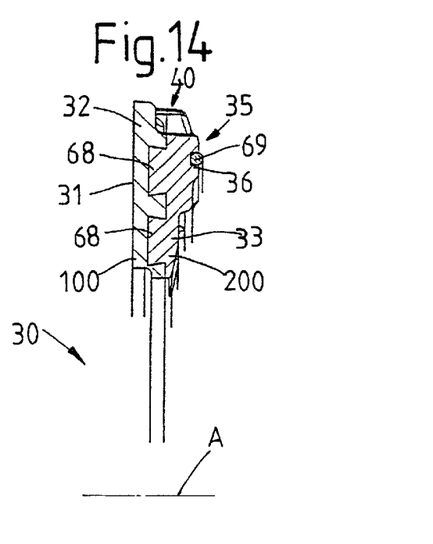
FIG. 14 shows a partial longitudinal section of an eleventh embodiment form of the pressure plate according to the invention.

FIG. 14 shows a pressure plate 30 which is constructed so as to be substantially identical to the pressure plate 30 shown in FIG. 13. By contrast, the pressure plate according to FIG. 14 has a wire ring 69 on the knife edge 36, the wire ring 69 being inserted in the latter. The wire ring 69 is prevented from slipping out accidentally by caulking and has the function of preventing abrasion on the knife edge 36.

Figure 15A:
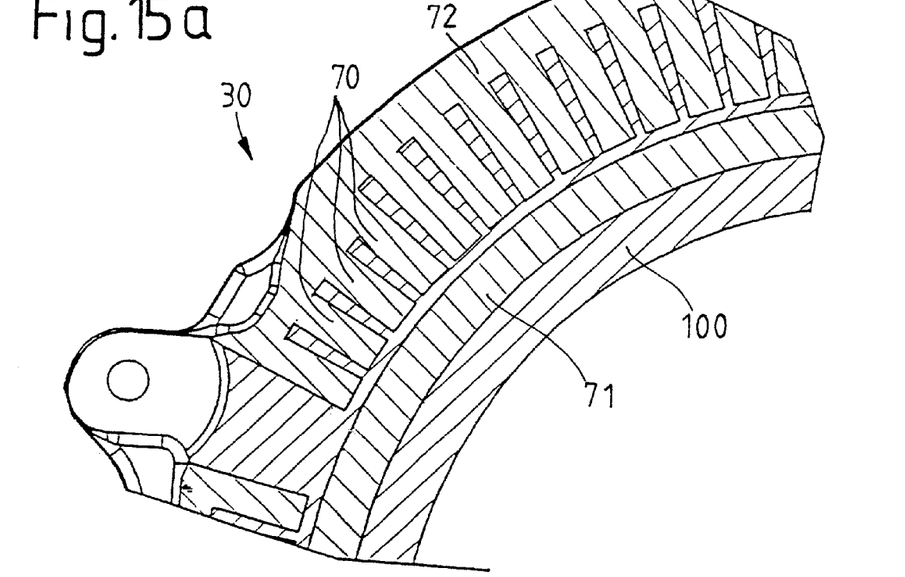
FIGS. 15a, 15b show a partial top view and a partial longitudinal section of a twelfth embodiment form of the pressure plate according to the invention.
Figure 15B:
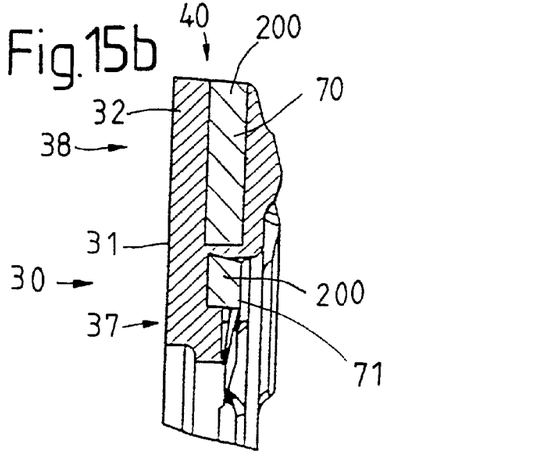

FIGS. 15a and 15 show a pressure plate 30 which has a plurality of radial bore holes 70 distributed along the circumference. While the pressure plate base body 40 is formed of first material 100, the bore holes 70 are filled, e.g., cast, with second material 200. A groove 72 serves as a ring path for the casting. A circular ring 71 located on the radial inner side 37 of the bore holes 70 likewise comprises the second material 200 and is cast, for example, in a corresponding groove.

Figure 16:
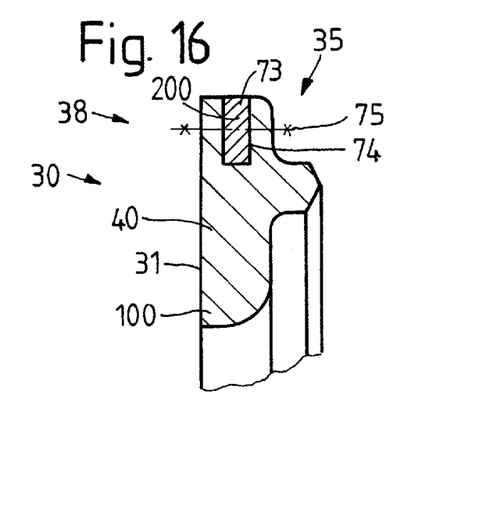
FIG. 16 shows a partial longitudinal section of a thirteenth embodiment form of the pressure plate according to the invention.

FIG. 16 shows a pressure plate 30 with a pressure plate base body 40 of first material 100 and with a friction surface 31. On the radial outer side 38, a groove 74 is provided in the pressure plate base body 40, wherein a circular ring 73 of second material 200 is located in the groove 74. The circular ring 73 can be constructed in segments or in one piece and can be inserted or cast in the groove 74. In addition, the circular ring 73 can be connected so as to be fixed radially with the pressure plate base body 40 via fixing pins 75, shown schematically, or by soldering (particularly in case of copper and zinc).

Figure 17A:
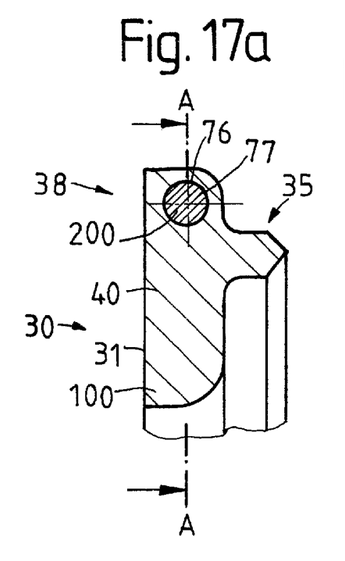
FIGS. 17a, 17b, 17c show various views of a fourteenth embodiment form of the pressure plate according to the invention.
Figures 17B, 17C:
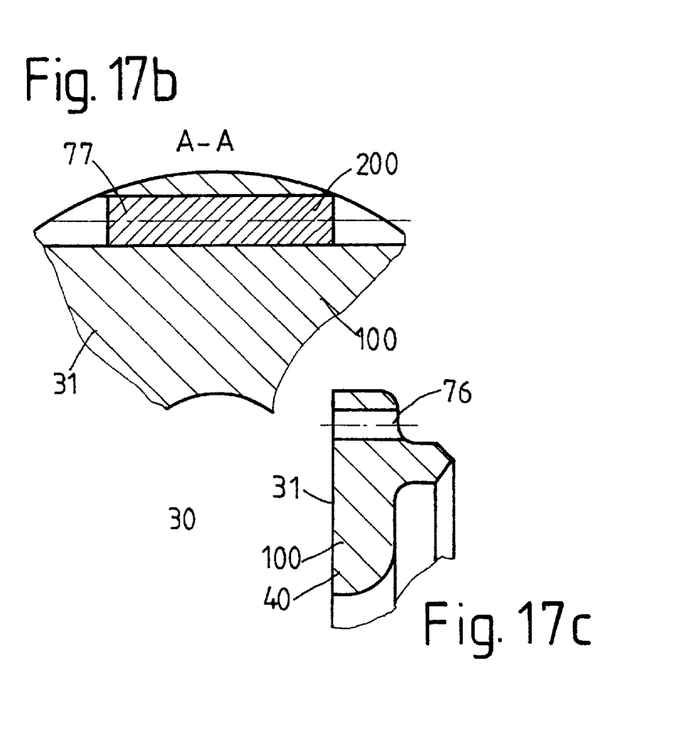

FIGS. 17a, 17b, 17c show another embodiment example of a pressure plate 30. A quantity of bore holes 76 are provided in the pressure plate base body 40 of first material 100 at its radial outer circumference 38, added elements 77 of the second material 200 being located in the bore holes 76. The added elements 77 can be constructed, for example, as correspondingly dimensioned bolts which are inserted into the bore holes 76. The bolts can be prevented from falling out by means of caulking. The added elements 77 can be introduced into the pressure plate 30 tangentially and/or axially and/or radially. Its radial dimension can be utilized in this case. When suitably fixed, for example, by means of soldering, caulking, screwing and the like, its axial dimension can also be utilized in addition.

Figure 18:
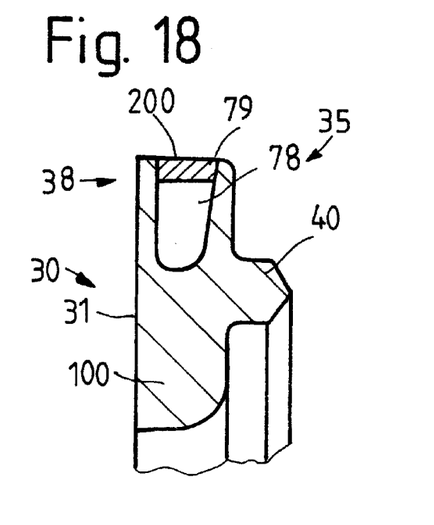
FIG. 18 shows a partial longitudinal section of a fifteenth embodiment form of the pressure plate according to the invention.

FIG. 18 shows a pressure plate 30 which has a wedge-shaped notch 78 in the radial outer region 38 of a pressure plate base body 40 of first material 100. A web 79 of second material 200 is inserted, for example, caulked, soldered, cast in in a positive engagement or the like, at the radial outer edge of the notch 78. The web 79 which forms, for example, a circular ring, only contacts a small annular region of the pressure plate base body 40. However, the pressure plate base body 40 is notched more deeply in this case, so that the outer region can bend elastically axially.

Figure 19:
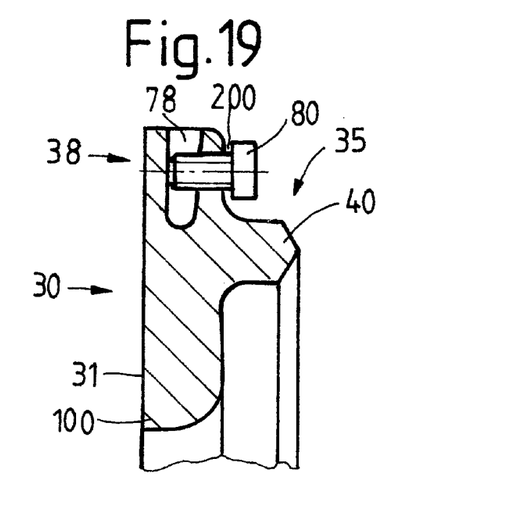
FIG. 19 shows a partial longitudinal section of a sixteenth embodiment form of the pressure plate according to the invention.

In contrast to FIG. 18, a quantity of bolts 80 which are formed of second material 200 are provided in the notch 78 according to FIG. 19 and the externally slit pressure plate 30 expands axially in elastic manner.

Figure 20:
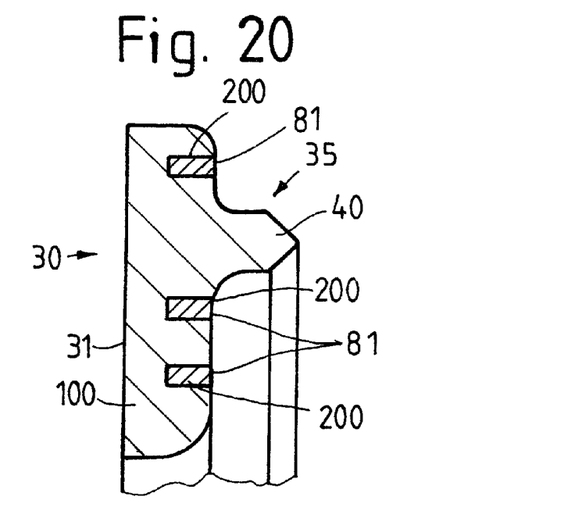
FIG. 20 shows a partial longitudinal section of a seventeenth embodiment form of the pressure plate according to the invention.
Figure 21:
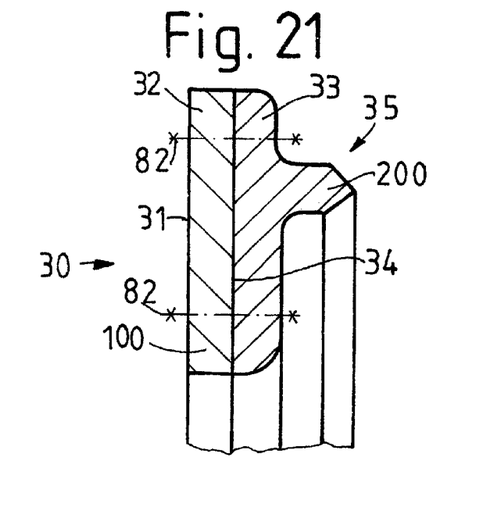
FIG. 21 shows a partial longitudinal section of an eighteenth embodiment form of the pressure plate according to the invention.

Finally, FIGS. 20 and 21 once again show examples for pressure plates 30 in which added elements or an entire region of the second material is provided on the side 35 of the pressure plate 30 which lies opposite the friction surface 31 and which is not heated. FIG. 20 shows an example in which one or more circular rings 81 of second material 200, three in the present case, are inserted and fixed in corresponding grooves in the pressure plate base body 40 formed of the first material 100. In the embodiment example shown in FIG. 21, the pressure plate base body 40 has a friction surface region 32 of first material 100 and an adjoining body region 33 of the second material 200. The two regions 32, 33 are, for example, soldered and/or connected with one another via a screw connection 82.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A pressure plate for a friction clutch, said pressure plate having an axis of rotation and a planar friction surface which can be pressed against a friction face of a clutch disk, said pressure plate being formed of a first material having a first thermal expansion coefficient and a second material having a second thermal expansion coefficient which is greater than said first thermal expansion coefficient, said second material being in thermal contact with said first material, said first and second materials being metals, said first and second materials being arranged and said first and second thermal coefficients being chosen so that umbrella deformation of said pressure plate is prevented and said friction surface remains at least substantially planar as said friction surface is heated by frictional contact with said clutch disk.

2. A pressure plate as in claim 1 wherein said first material has a first thermal conductivity and said second material has a second thermal conductivity which is greater than said first thermal conductivity.

3. A pressure plate as in claim 1 wherein said second material is an added material in the pressure plate.

4. A pressure plate as in claim 1 wherein said friction surface is formed at least substantially of said first material.

5. A pressure plate as in claim 4 wherein said first material comprises one of cast iron and steel, and said second material comprises one of magnesium, aluminum, copper, and zinc.

6. A pressure plate as in claim 1 wherein said friction surface is formed at least substantially of said second material.

7. A pressure plate as in claim 1 wherein said second material is arranged so that it can expand radially.

8. A pressure plate as in claim 1 wherein said second material is arranged so that it can expand axially.

9. A pressure plate as in claim 1 wherein said pressure plate comprises an outer radial circumference, said second material being provided at the outer radial circumference.

10. A pressure plate as in claim 9 wherein said pressure plate comprises at least one notch in said outer radial circumference, said second material being provided in said at least one notch.

11. A pressure plate as in claim 10 wherein said second material is provided in the form of a web spanning said notch.

12. A pressure plate as in claim 10 wherein said second material is provided in the form of a bolt extending axially through said notch.

13. A pressure plate as in claim 1 wherein said pressure plate comprises a radial inner region, said second material being provided in the radial inner region.

14. A pressure plate as in claim 13 further comprising a groove in said radial inner region, said second material being provided in said groove.

15. A pressure plate as in claim 1 wherein said pressure plate comprises an opposite side which lies opposite said friction surface, said second material being provided in said opposite side.

16. A pressure plate as in claim 15 further comprising a groove in said opposite side, said second material being provided in said groove.

17. A pressure plate as in claim 1 wherein said pressure plate comprises a groove which receives said second material.

18. A pressure plate as in claim 17 wherein said groove is inclined with respect to said axis.

19. A pressure plate as in claim 1 wherein said second material comprises at least one circular ring comprising at least one part formed as an arc segment.

20. A pressure plate as in claim 19 wherein said circular ring comprises at least one pin which extends into said first material.

21. A pressure plate as in claim 1 wherein said pressure plate comprises at least one bore hole, said second material being provided in said bore hole.

22. A pressure plate as in claim 21 wherein said at least one bore hole is oriented one of tangentially, radially, and axially.

23. A pressure plate as in claim 1 wherein said pressure plate comprises an annular plate forming said friction surface, and a body region axially adjoining said annular plate.

24. A pressure plate as in claim 23 wherein said body region is formed by said second material.

25. A pressure plate as in claim 23 wherein one of said annular plate is provided with a dovetail groove for retaining said body region.

26. A pressure plate as in claim 1 wherein pressure plate comprises a knife edge for supporting an energy accumulator, said knife edge comprising means for preventing abrasion.

27. A pressure plate as in claim 26 wherein said means for preventing abrasion comprises a separate component which is fixed to said pressure plate.

28. A pressure plate as in claim 1 wherein said first material has a first profile and said second material has a second profile which conforms to said first profile.

29. A pressure plate as in claim 1 wherein said pressure plate is formed with a chamber, and said second material at least partially fills said chamber.

30. A pressure plate as in claim 29 wherein said chamber is formed wholly in said first material.

31. A pressure plate as in claim 29 further comprising a third material, said chamber being formed by said first material and said third material, at least part of said third material being located opposite said chamber from said friction surface.

32. A pressure plate as in claim 1 wherein said first material and said second material are separated by a dividing line which extends radially.

33. A pressure plate as in claim 32 wherein second material has an axial thickness which increases with radial distance from said axis.

34. A pressure plate as in claim 1 wherein said first material and said second material are separated by a dividing line which extends axially, said second material lying radially outside of said dividing line.

35. A pressure plate as in claim 1 wherein said second material is introduced into said first material by die casting.

36. A pressure plate as in claim 1 wherein said first material and said second material are mechanically engaged.

37. A pressure plate as in claim 1 wherein said pressure plate comprises an outer radial circumference having a circumferential channel therein, and a circular support element in said channel.

* * * * *